United States Patent [19]

Beer et al.

[11] Patent Number: 5,672,641
[45] Date of Patent: Sep. 30, 1997

[54] SECONDARY COATING COMPOSITIONS FOR GLASS FIBERS, GLASS FIBERS COATED WITH THE SAME AND COMPOSITES REINFORCED THEREWITH

[75] Inventors: Kenneth D. Beer, Vandergrift; Barbara Anderson, Saltsburg, both of Pa.; Richard Alan Davis, Shelby, N.C.

[73] Assignee: PPG Industries, Inc., Pittsburgh, Pa.

[21] Appl. No.: 376,998

[22] Filed: Jan. 23, 1995

[51] Int. Cl.⁶ .................. C08K 9/06; D02G 3/00
[52] U.S. Cl. .............. 523/214; 523/212; 524/863; 524/837; 428/378; 428/391; 428/392
[58] Field of Search ............ 428/392, 391, 428/378; 524/863, 837; 523/212, 214

[56] References Cited

U.S. PATENT DOCUMENTS

| | | | |
|---|---|---|---|
| 2,608,499 | 8/1952 | Straka | 154/43 |
| 3,079,281 | 2/1963 | Dexter et al. | 117/161 |
| 3,299,112 | 1/1967 | Bailey | 260/448.2 |
| 3,461,027 | 8/1969 | Plueddemann | 161/193 |
| 3,493,425 | 2/1970 | Campbell | 117/138.8 |
| 3,498,824 | 3/1970 | Chadha | 117/72 |
| 3,556,754 | 1/1971 | Marsden et al. | 65/3 |
| 3,567,570 | 3/1971 | Preston et al. | 161/193 |
| 3,664,982 | 5/1972 | Preston et al. | 260/29.4 |
| 3,956,401 | 5/1976 | Scardera et al. | 260/615 B |
| 4,033,924 | 7/1977 | Mine et al. | 260/37 SB |
| 4,035,550 | 7/1977 | Suh et al. | 428/339 |
| 4,070,298 | 1/1978 | Scardera et al. | 252/89 R |
| 4,105,567 | 8/1978 | Koerner et al. | 252/8.6 |
| 4,118,540 | 10/1978 | Amort et al. | 428/447 |
| 4,124,730 | 11/1978 | Albert et al. | 427/220 |
| 4,177,322 | 12/1979 | Homan et al. | 428/447 |
| 4,207,071 | 6/1980 | Lipowitz et al. | 8/115.6 |

(List continued on next page.)

FOREIGN PATENT DOCUMENTS

| | | |
|---|---|---|
| 1 125 436 | 10/1956 | France . |
| 56713 | 6/1969 | France . |
| 1 114 966 | 10/1961 | Germany . |
| 1 158 219 | 11/1963 | Germany . |
| 3736205A1 | 5/1989 | Germany . |
| 4207832C1 | 3/1993 | Germany . |
| 1278484 | 6/1972 | United Kingdom . |
| WO 94/11318 | 5/1994 | WIPO . |

OTHER PUBLICATIONS

"SILWET Surfactants", Technical Bulletin, Union Carbide Corporation.
"MASIL® SF 19 Surfactant, Silicone Surfactant" Technical Bulletin, PPG Industries, Inc.
Material Safety Data Sheet, Product Information, MASIL® SF 19A, PPG Industries, Inc.
Material Safety Data Sheet, Product Information, MASIL® SF 19 Surfactant, PPG Industries, Inc.
"SILWET Surfactants" Technical Bulletin, Union Carbide Chemicals and Plastics.

Primary Examiner—Karen A. Dean
Attorney, Agent, or Firm—Ann Marie Odorski

[57] ABSTRACT

The present invention includes aqueous coating compositions adapted to coat a plurality of sized glass fibers, glass fibers coated with the same and composites reinforced with the coated glass fibers. The coating composition includes (a) a polysiloxane having: (1) an alkyl substituent attached through a carbon atom directly to a silicon atom of the polysiloxane; (2) an alkoxy substituent attached through a carbon atom directly to a silicon atom of the polysiloxane, the alkoxy substituent having an alkyl group, an alkyl ether group and a terminal group selected from the group consisting of hydrogen and an alkoxy group having about 1 to about 8 carbon atoms; and (3) endblocking groups independently selected from the group consisting of a phenyl group, an alkyl group having about 1 to about 20 carbon atoms and combinations thereof, wherein the polysiloxane is essentially free of silicon-bonded hydroxy groups and alkoxy groups attached through an oxygen atom directly to a silicon atom of the polysiloxane, and (b) zero to less than about 50 weight percent on a total solids basis of a film-forming material capable of forming a uniform continuous coating on the glass fibers.

38 Claims, 1 Drawing Sheet

U.S. PATENT DOCUMENTS

| | | | |
|---|---|---|---|
| 4,210,696 | 7/1980 | Ikeda et al. | 428/212 |
| 4,228,194 | 10/1980 | Meeder | 428/288 |
| 4,277,382 | 7/1981 | Lin et al. | 260/29.2 M |
| 4,340,090 | 7/1982 | Matsushita et al. | 138/177 |
| 4,408,031 | 10/1983 | Holtschmidt et al. | 528/26 |
| 4,448,840 | 5/1984 | Matsushita | 428/266 |
| 4,455,330 | 6/1984 | Nishioka et al. | 427/379 |
| 4,460,639 | 7/1984 | Chi et al. | 428/224 |
| 4,460,640 | 7/1984 | Chi et al. | 428/224 |
| 4,473,603 | 9/1984 | Hockemeyer et al. | 427/387 |
| 4,478,895 | 10/1984 | Makami et al. | 427/407.3 |
| 4,486,495 | 12/1984 | Matsushita et al. | 428/266 |
| 4,489,127 | 12/1984 | Gutek et al. | 428/266 |
| 4,504,549 | 3/1985 | Pines et al. | 428/447 |
| 4,555,447 | 11/1985 | Sieloff et al. | 428/392 |
| 4,735,831 | 4/1988 | Rubin et al. | 427/445 |
| 4,742,103 | 5/1988 | Morita et al. | 524/174 |
| 4,752,527 | 6/1988 | Sanzero et al. | 428/391 |
| 4,868,063 | 9/1989 | Okamura et al. | 428/429 |
| 5,085,938 | 2/1992 | Watkins | 428/378 |
| 5,182,173 | 1/1993 | Swei | 428/391 |
| 5,219,656 | 6/1993 | Klett et al. | 428/378 |
| 5,242,958 | 9/1993 | Klett | 523/444 |
| 5,266,715 | 11/1993 | Harisiades et al. | 556/419 |
| 5,281,658 | 1/1994 | Ona et al. | 524/838 |
| 5,340,897 | 8/1994 | Loiselle et al. | 528/17 |
| 5,352,491 | 10/1994 | Cifuentes et al. | 427/387 |
| 5,387,467 | 2/1995 | Hoehner et al. | 428/391 |
| 5,521,238 | 5/1996 | Ona et al. | 524/157 |

SECONDARY COATING COMPOSITIONS FOR GLASS FIBERS, GLASS FIBERS COATED WITH THE SAME AND COMPOSITES REINFORCED THEREWITH

FIELD OF THE INVENTION

This invention relates generally to secondary coating compositions which are applied to sized glass fibers. More particularly, this invention relates to such coated glass fibers for reinforcing thermosetting materials having oxide-based pigment systems for use in, for example, panel, sheet molding compound and spray-up (gun roving) processes.

BACKGROUND OF THE INVENTION

Typically, the surfaces of glass fibers are coated with a sizing composition during the forming process to protect the glass fibers from interfilament abrasion. Such sizing compositions can include as components film-formers, lubricants, coupling agents, emulsifiers, anti-oxidants, ultraviolet light stabilizers, colorants, antistatic agents and water, to name a few.

For example, U.S. Pat. No. 3,556,754 discloses coating compositions suitable for sizing glass fibers which contain, as essential ingredients, a film former, a lubricant and an antistatic agent which is a siloxane-oxyalkylene block copolymer.

German Patent No. 1,158,219 discloses organopolysiloxanes modified with polyalkylene glycols or their monoethers as preparation media for glass fibers. The polyalkylene glycols or monoethers are attached through an oxygen atom to a carbon atom of the polysiloxane.

Typically, sized glass fibers are gathered into a strand, wound to form a forming package, and dried. The strands can be further processed by chopping, combination in parallel to form a bundle or roving, or forming into a cloth or mat, for example. Prior to this further processing, a secondary coating can be applied to the strands or roving.

The coated continuous strands, chopped strands, roving, cloth or mat can be used to reinforce thermosetting and/or thermoplastic matrix materials. Composites formed from such reinforced thermoplastic and thermosetting materials can be used as automobile components, boat hulls and fishing rods, for example.

The matrix materials can further include pigments for providing color to the composites. Typical pigments include cadmium-based pigments and oxide-based pigments which are iron oxide-based or lead oxide-based, for example.

Traditional amine, amide and quaternary salts such as soyadimethylethyl ammonium ethosulfate can react with oxide-based pigments in matrix systems to discolor the resulting composites. It is desirable to have an antistatic or lubricating composition which will not appreciably discolor composites produced from matrix materials including oxide-based pigments.

SUMMARY OF THE INVENTION

One aspect of the present invention is an aqueous coating composition adapted to coat a plurality of glass fibers having thereon the dried residue of a sizing composition. The aqueous coating composition comprises (a) a polysiloxane having: (1) an alkyl substituent attached through a carbon atom directly to a silicon atom of the polysiloxane; (2) an alkoxy substituent attached through a carbon atom directly to a silicon atom of the polysiloxane, the alkoxy substituent comprising an alkyl group, an alkyl ether group and a terminal group selected from the group consisting of hydrogen and an alkoxy group having about 1 to about 8 carbon atoms; and (3) endblocking groups independently selected from the group consisting of a phenyl group, an alkyl group having about 1 to about 20 carbon atoms and combinations thereof, wherein the polysiloxane is essentially free of silicon-bonded hydroxy groups and alkoxy groups attached through an oxygen atom directly to a silicon atom of the polysiloxane, and (b) zero to less than about 50 weight percent on a total solids basis of a film-forming material capable of forming a uniform continuous coating on the glass fibers.

Other aspects of the present invention include glass fiber strands comprising a plurality of sized glass fibers having thereon the dried residue of the above aqueous coating composition and glass fiber-reinforced composites comprising the coated glass fiber strands and a matrix material.

DETAILED DESCRIPTION OF THE PREFERRED EMBODIMENT

Figure 1:
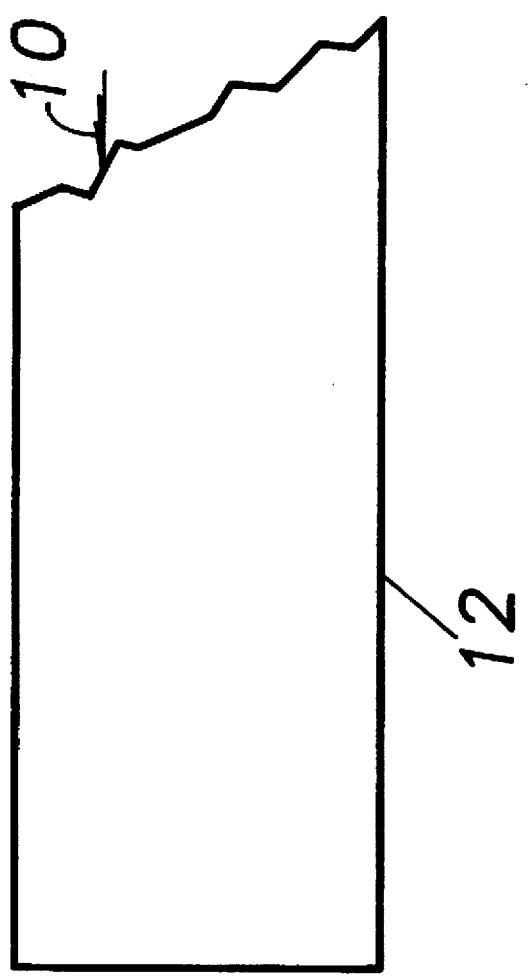

The foregoing summary, as well as the following detailed description of the preferred embodiment, will be better understood when read in conjunction with the appended drawing. In the drawing:

FIG. 1 is a top plan view of a portion of a composite according to the present invention, partially broken away to show coated glass fiber strands of the present invention.

DETAILED DESCRIPTION OF THE PREFERRED EMBODIMENT

The aqueous secondary coating compositions of the present invention are adapted to coat a plurality of glass fibers, strand(s) or roving having thereon the dried residue of a sizing composition. As used herein, the terms "size" or "sizing" refer to the aqueous composition applied to the fibers immediately after formation.

Such sizing compositions can include as components film-formers such as starch and/or thermoplastic or thermosetting polymeric film-formers and mixtures thereof, lubricants such as animal, vegetable or mineral oils or waxes, coupling agents, emulsifiers, anti-oxidants, ultraviolet light stabilizers, colorants, antistatic agents and water, to name a few. Examples of suitable sizing compositions are set forth in K. Loewenstein, *The Manufacturing Technology of Continuous Glass Fibres* at pages 243–295 (2d Ed. 1983) and U.S. Pat. Nos. 4,752,527, 5,219,656 and 5,242,958, each of which is hereby incorporated by reference.

The term "secondary coating" refers to a coating composition applied secondarily to one or a plurality of strand(s) after the sizing is applied. The aqueous secondary coating compositions of the present invention comprise one or more polysiloxanes. Useful polysiloxanes are essentially free of silicon-bonded hydroxy groups and alkoxy groups attached through an oxygen atom directly to a silicon atom of the polysiloxane.

The polysiloxane comprises one or more alkyl substituents and one or more alkoxy substituents attached to the polysiloxane backbone. Other substituents which can be attached to the polysiloxane backbone include aryl groups such as phenyl groups, alkyl groups which are preferably straight chain and which can contain about 1 to about 5 carbon atoms and aromatic groups such as benzene rings. The secondary coating composition can, and preferably does, comprise a mixture of a plurality of different polysiloxanes, although a single such type of polysiloxane is also useful.

The alkyl substituents are attached through carbon atoms directly to silicon atoms of the polysiloxane. The alkyl substituents can be independently selected from branched or straight chain alkyl groups and each alkyl substituent contains from about 1 to about 5 carbon atoms. Preferably, the alkyl substituents are methyl groups.

The alkoxy substituents are attached through carbon atoms directly to silicon atoms of the polysiloxane. The alkoxy substituent comprises an alkyl group, an alkyl ether group and a terminal hydrogen or alkoxy group.

The alkyl group of the alkoxy substituent contains from about 3 to about 12 carbon atoms and can be straight chained or branched, although the alkyl group is preferably straight chained. Non-limiting examples of useful straight chained alkyl groups include n-propyl, n-butyl, n-pentyl, n-hexyl, n-heptyl, n-octyl, n-nonyl, n-decyl, n-undecyl and n-dodecyl. Useful branched alkyl groups include isobutyl, isopentyl, neopentyl, 2-methylpentyl, 3-methylpentyl, 2,2-dimethylbutyl and 2,3-dimethylbutyl. Preferably, the alkyl group is an n-propyl group.

Suitable alkyl ether groups include those of the general formula $(C_nH_{2n}O)_q$, where n has an average value of about 2 to about 6 and q has an average value of about 1 to about 100 inclusive.

Preferably, n has an average value of about 2 to about 6, more preferably about 2 to about 3, and most preferably is an ethoxy group. Preferably q has an average value of about 3 to about 100, and more preferably about 3 to about 60. The average value of q is most preferably about 7 or 8.

Non-limiting examples of useful alkyl ether groups include:

(1) $(C_2H_4O)_a$;

(2) $(C_3H_6O)_b$;

(3) $(C_4H_8O)_c$; and (4) combinations thereof, where a, b, and c each independently can have any of the ranges of average values of q set forth above. Preferably, a has an average value of 0 to about 24, and more preferably about 1 to about 12. Preferably, b has an average value of 0 to about 24, and more preferably 0 to about 10. Preferably, c has an average value of 0 to about 24, and more preferably 0 to about 12.

The terminal group of the alkoxy substituent can be hydrogen or an alkoxy group having about 1 to about 5 carbons and which can be straight chain or branched. Preferably, the terminal group of the alkoxy substituent is hydrogen.

The polysiloxanes of the present invention comprise endblocking groups independently selected from one or more phenyl groups, one or more alkyl groups and combinations thereof. Suitable alkyl groups can have about 1 to about 20 carbon atoms, preferably about 1 to about 3 carbons, and more preferably about 1 to about 2 carbons. Non-limiting examples of useful alkyl endblocking groups include methyl, ethyl and propyl, to name a few. The preferred endblocking groups are methyl groups.

Non limiting examples of preferred polysiloxanes useful in the present invention comprise one or more units of the following unit formulae:

(A) $(CH_3)_3SiO$ or $(Ph)_3SiO$;

(B) $(CH_3)_2SiO$; and (C) 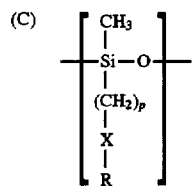

in which

Ph is a phenyl group; p has an average value of about 3 to about 12 inclusive; R is selected from the group consisting of hydrogen and an alkoxy group having about 1 to about 8 carbons; and X is an alkyl ether group of the formula $(C_nH_{2n}O)_q$ discussed above. More preferably, p has an average value of about 3 to about 6 inclusive.

In the above example, (A) is generally present in an amount of from about 10 to about 40 mole percent based upon the total mole percentage of (A)+(B)+(C), and preferably about 20 to about 40 mole percent. (B) is generally present in an amount of from zero to about 80 mole percent based upon the total mole percentage of (A)+(B)+(C), preferably zero to about 50 mole percent and more preferably zero mole percent. (C) is generally present in an amount of from about 10 to about 90 mole percent based upon the total mole percentage of (A)+(B)+(C), and more preferably about 60 to about 80 mole percent.

Preferably, the polysiloxanes of the present invention are represented by the following formula:

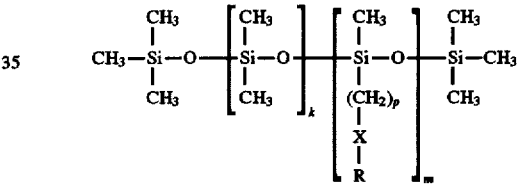

where k has an average value of 0 to about 50 inclusive, and preferably 0 to about 5 inclusive; m has an average value of about 1 to about 24 inclusive, and preferably 0 to about 5 inclusive; p has an average value of about 3 to about 12 inclusive, and preferably about 3 to about 6 inclusive; R is selected from the group consisting of hydrogen and an alkoxy group having about 1 to about 8 carbons, and the alkyl ether group X is selected from the group consisting of:

(1) $(C_2H_4O)_a$;

(2) $(C_3H_6O)_b$;

(3) $(C_4H_8O)_c$; and (4) combinations thereof;

where a, b and c each independently have average values of about 1 to about 100, preferably about 3 to about 100 and more preferably about 3 to about 60. Preferably, a has a value of about 3 to about 12 inclusive, b has a value of 0 to about 10 inclusive and c has a value of 0 to about 12 inclusive.

Generally, the number average molecular weight of the polysiloxane is about 400 to about 10,000 and preferably about 500 to about 9000. More preferably, the number average molecular weight of the polysiloxane is about 500 to about 1200 as determined by gel permeation chromatography (GPC) using polystyrene as a standard.

Such polysiloxanes can be synthesized, for example, by equilibrating polymethyl hydrosiloxane with hexamethyl siloxane in the presence of a strong acid to form the polysiloxane backbone comprised of siloxane units. The resulting equilibrium mixture is neutralized and can be purified, if necessary. The equilibrium product is combined with an allyl polyalkoxylate in the presence of a platinum catalyst and reacted until SiH groups are no longer present. One skilled in the art can synthesize such polysiloxanes in view of the above disclosure through routine experimentation and further disclosure of methods of making such materials is not believed to be necessary.

An example of a polysiloxane useful in the present invention is SILWET® Surfactant L-77, a polyalkylene oxidemodified methylpolysiloxane which is commercially available from OSi Specialties, Inc. of Danbury, Conn.

Preferably, the polysiloxane is Masil® SF-19, which has a polydimethylsiloxane backbone modified by polyoxyalkylene chains. Masil® SF-19 has a viscosity of about 40 to about 50 centistokes at 25° C., a specific gravity of 1.03 at 25° C., about 98.5% or more non-volatiles, a refractive index of about 1.4550 at 25° C. and a pH of about 5 to about 7 (3% aqueous solution). Technical Bulletin Masil® SF-19 Surfactant Nov. 2, 1994. Masil® SF-19A, which is more preferred, includes about 15 weight percent of the above modified polydimethylsiloxane, about 10 weight percent 2-propanol (isopropyl alcohol) on a total weight basis and water. Both Masil® SF-19 and Masil® SF-19A are commercially available from PPG Industries, Inc. of Pittsburgh, Pa.

The polysiloxanes comprise about 1 to about 99 weight percent of the aqueous coating composition on a total weight percent basis. Preferably, the polysiloxanes comprise about 5 to about 30 weight percent of the aqueous coating composition on a total weight percent basis, and more preferably about 10 to about 20 weight percent.

The aqueous coating composition of the present invention comprises zero to less than about 50 weight percent on a total solids basis of a film-forming material capable of forming a uniform or solid continuous coating on the glass fibers. Preferably, the aqueous coating composition comprises less than about 20 weight percent of such film-forming materials and more preferably less than about 5 weight percent, i.e., is essentially free of such film-forming materials.

Such film-forming materials include starches, cellulosic materials, thermoplastic materials, thermosetting materials and mixtures thereof. Examples of the thermoplastic and thermosetting film-forming materials include thermoplastic or thermosetting acrylic polymers, aminoplasts, alkyds, polyepoxides, phenolics, polyamides, polyolefins, polyesters, polyurethanes, vinyl polymers, derivatives and mixtures thereof.

Water (preferably deionized) is included in the aqueous coating composition in an amount sufficient for application of the coating composition to the plurality of sized glass fibers. Preferably, the weight percentage of solids is about 1 to about 35 weight percent of the aqueous coating composition and, more preferably, about 10 to about 20 weight percent.

Preferably, the aqueous coating composition of the present invention further comprises a water-soluble, polar solvent for the polysiloxane. Useful solvents include alcohols, ketones, water soluble glycol ethers and mixtures thereof.

Suitable alcohols can be monohydric or polyhydric, and primary, secondary, or tertiary alcohols. Non-limiting examples of useful alcohols include monohydric alcohols such as methanol, ethanol, 1-propanol, 2-propanol, 1-butanol, 2-methyl-1-propanol, 2-butanol, 2-methyl-2-propanol, 1-pentanol, 1-hexanol, 1-heptanol, 2-propanol, cyclohexanol; polyhydric alcohols such as 1,2-ethanediol, 1,2-propanediol, 1,2,3-propanetriol and mixtures thereof.

Non-limiting examples of useful ketones preferably include hydroxyl groups and can include acetone, methyl ethyl ketone, methyl isopropyl ketone, methyl isobutyl ketone, methyl ethyl butyl ketone, acetoin (3-hydroxy-2-butanone), ethylketol, diacetone alcohol (4-hydroxy-4-methylpentanone-2), propioin and mixtures thereof.

Suitable water soluble glycol ethers include methyl ethers of ethylene glycol such as Dowanol™ PM, which is commercially available from Dow Chemical USA of Midland, Mich., and ethyl ethers of ethylene glycol such as Cellosolve, which is commercially available from Union Carbide of Danbury, Conn.

Generally, the solvent is less than about 40 weight percent of the aqueous coating composition on a total weight basis, preferably about 2 to about 20 weight percent and more preferably about 5 to about 15 weight percent.

The aqueous coating composition can also further comprise one or more additives such as antioxidants, ultraviolet light stabilizers, cure promoters, surfactants and mixtures thereof.

Non-limiting examples of suitable antioxidants include hindered phenols, amines such as diaryl amines and aryl- or alkyl-substituted phenylene diamines and diphenylamines, propionates and phosphites such as the Irganox™ materials which are available from Ciba-Geigy Corp. of Greensboro, N.C., and other phosphorus-containing antioxidant materials such as phosphites, phosphates and fluorophosphonites.

Ultraviolet light stabilizers which are useful in the present invention include hindered-amine light stabilizers (HALS) such as are available from Atochem N.A. of Philadelphia, Pa.

Useful cure promoters include allylic compounds, such as triallyl cyanurate and melamine formaldehyde can be used in the present invention. Suitable allylic compounds are disclosed in U.S. Pat. No. 5,219,656, which was incorporated by reference above.

Non-limiting examples of suitable surfactants or emulsifying agents include polyoxyalkylene block copolymers, ethoxylated alkyl phenols, polyoxyethylene octylphenyl glycol ethers, ethylene oxide derivatives of sorbitol esters and polyoxyethylated vegetable oils.

An example of a suitable polyoxypropylene-polyoxyethylene copolymer is the material PLURONIC™ F-108 which is commercially available from BASF Corporation of Parsippany, N.J.. This material is a condensate of ethylene oxide with hydrophobic bases formed by condensation of propylene oxide with propylene glycol.

Examples of useful ethoxylated alkyl phenols include ethoxylated octylphenoxyethanol, phenoxy polyethyleneoxy(ethanol), phenoxy(ethyleneoxy)ethanol and nonyl phenoxy poly(ethyleneoxy) ethanol. Examples of commercially available ethoxylated octylphenoxyethanols are IGEPAL CA-630 from GAF Corporation of Wayne, N.J. and Macol OP-10 from PPG Industries, Inc.

An example of a polyoxyethylated vegetable oil is EMULPHOR EL-719, which is commercially available from GAF Corp. A useful polyoxyethylene octylphenyl glycol ether is Triton X-100, which is commercially available from Rohm & Haas of Philadelphia, Pa. Tween 81 is an example of a useful ethylene oxide derivative of a sorbitol ester.

Other examples of suitable emulsifying agents include non-ionic epoxide polyols such as NOVEPOX™ or Prox E 117, which are commercially available from Synthron, Inc.

Generally, the emulsifying agent comprises about 0.5 to about 40 weight percent of the sizing composition on a total solids basis and, more preferably, about 4 to about 15 weight percent.

Useful lubricants include cationic, non-ionic or anionic glass fiber lubricants and mixtures thereof. The amount of lubricant can be about 1 to about 20 weight percent of the curable composition on a total solids basis. Non-limiting examples of such lubricants include amine salts of fatty acids (which can, for example, include a fatty acid moiety having 12 to 22 carbon atoms and/or tertiary amines having alkyl groups of 1 to 22 atoms attached to the nitrogen atom), alkyl imidazoline derivatives (such as can be formed by the reaction of fatty acids with polyalkylene polyamines), acid solubilized fatty acid amides (for example, saturated or unsaturated fatty acid amides having acid groups of 4 to 24 carbon atoms such as stearic amide), acid solubilized polyunsaturated fatty acid amides, condensates of a fatty acid and polyethylene imine and amide substituted polyethylene imines, such as Emery 6717, a partially amidated polyethylene imine commercially available from Henkel Corporation of Kankakee, Ill.

The aqueous coating composition can further include one or more functional organo silane coupling agents. Such functional organo silane coupling agent typically have dual functionality. Each metal or silicon atom has attached to it one or more hydrolyzable groups which can react with the glass surface to remove hydroxyl groups and one or more groups which can react with a film-forming material to form a chemical bridge between the glass surface and the material. Examples of hydrolyzable groups include:

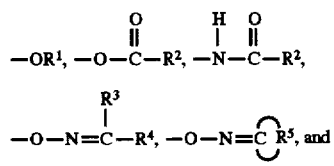

the monohydroxy and/or cyclic $C_2$-$C_3$ residue of a 1,2- or 1,3 glycol, wherein $R^1$ is $C_1$-$C_3$ alkyl; $R^2$ is H or $C_1$-$C_4$ alkyl; $R^3$ and $R^4$ are independently selected from H, $C_1$-$C_4$ alkyl or $C_6$-$C_8$ aryl; and $R^5$ is $C_4$-$C_7$ alkylene. Examples of groups reactive with film-forming materials include epoxy, glycidoxy, mercapto, cyano, allyl, urethano, halo, isocyanato, ureido, imidazolinyl, vinyl, acrylato, methacrylato, amino or polyamino groups.

Non-limiting examples of useful functional organo silane coupling agents include epoxy (A-187 gamma-glycidoxypropyltrimethoxysilane), methacrylate (A-174 gamma-methacryloxypropyltrimethoxysilane) and amino (A-1100 gamma-aminopropyltriethoxysilane) silane coupling agents, each of which is commercially available from OSi Specialties, Inc. of Danbury, Conn. Other examples of useful silane coupling agents are set forth in K. Loewenstein, *The Manufacturing Technology of Continuous Glass Fibres* at page 263 (2d Ed. New York 1983), which is hereby incorporated by reference.

The amount of functional organo silane coupling agent can be about 1 weight percent to about 10 weight percent of the coating composition on a total solids basis, and is preferably about 1 to about 5 weight percent.

The aqueous coating composition of the present invention can be prepared by any suitable method well known to those of ordinary skill in the art. The polysiloxane and any additional components can be diluted in deionized water in individual tanks and well mixed before being combined with the other components in a main mixing tank. The organo functional silane coupling agent(s), if present, can be at least partially hydrolyzed by reaction with the organic acid in the presence of water. After each of the premixed ingredients is added to the main mix tank, sufficient water is added to provide the aqueous coating composition with the desired total solids content.

The aqueous coating composition of the present invention can be applied to any type of fiberizable glass composition known to those of ordinary skill in the art. Glass fibers suitable for use in the present invention include those prepared from fiberizable glass compositions such as "E-glass", "621-glass", "A-glass", "C-glass", "S-glass", "ECR-glass" (corrosion resistant glass) and fluorine and/or boron-free derivatives thereof. Such compositions are well known to those skilled in the art and are disclosed in Loewenstein at pages 33–45, which is hereby incorporated by reference.

The glass fibers are coated with a sizing composition such as is discussed above and wound to form a forming package. The sizing composition on the glass fibers is preferably substantially dried before application of the secondary coating composition of the present invention. The forming packages can be dried, for example, in an oven to reduce the water content and cure any curable components of the sizing composition. Examples of suitable methods and apparatus for forming and winding sized glass fibers and applying sizing compositions to the same are disclosed generally in Loewenstein at pages 118–207 and are well known to those skilled in the art.

The aqueous coating composition can be applied to at least a portion of the glass fiber strand(s) by any conventional applicator means, such as by dipping the strand(s) in a bath containing the coating composition, spraying the strand(s) with the coating composition, metering the coating composition onto the strands or contacting the strand(s) with a conventional applicator bearing the coating composition, such as a slot applicator or stationary or rotating roller applicator. The term "strand" as used herein refers to a plurality of fibers or filaments.

The strands having the coating composition applied thereto can be chopped or gathered together to form a roving of a plurality of strands, for example. The roving package can be dried in an oven at a temperature of about 90° C. to about 150° C. for about 1 hour to about 4 hours to produce roving having a dried residue of the coating composition thereupon. The drying temperature will depend upon such variables as the percentage of solids in the coating composition, components of the coating composition and type of glass fiber. The coating composition provides glass fiber strand having about 0.01 to about 1.0 weight percent of the dried coating composition on the strand based upon total weight of the glass and dried sizing and coating compositions, and preferably about 0.01 to about 0.15 weight percent.

The strands can be used in the form of continuous strands or roving, woven glass fiber strand mat or chopped glass fibers to reinforce a thermosetting or thermoplastic matrix material, as desired, by any method known in the art, for example by open lay-up molding using resin and glass fiber spray-up equipment, preforms for press molding, sheet molding and dough molding, pultrusion, filament winding and panel formation processes. The coated strands can also be used in textile applications such as weaving to produce, for example, cloth for a variety of applications such as printed circuit boards, fire-resistant articles and screens. As shown in FIG. 1, the coated strands 10 are used to reinforce a panel or composite 12. Chopped roving can be used in a variety of processes for providing reinforcement, for example open lay-up molding using resin and glass fiber spray-up equipment, preforms for press molding, sheet molding and dough molding. Continuous rovings can be used in winding, weaving and pultrusion processes.

Non-limiting examples of thermosetting matrix materials which can be reinforced by glass fiber include polyesters, vinyl esters, epoxides, phenolics, aminoplasts, thermosetting polyurethanes, derivatives and mixtures thereof. Examples of useful thermoplastic matrix materials include polyolefins, polyamides, thermoplastic polyurethanes, acrylic polymers, vinyl polymers, polyolefins, derivatives and mixtures thereof.

The matrix material can be a thermoplastic or thermosetting matrix material. Non-limiting examples of useful thermosetting matrix materials are polyesters, vinyl esters, epoxides, phenolics, aminoplasts, thermosetting polyurethanes and combinations thereof. Examples of suitable thermoplastic matrix materials include polyolefins, polyamides, thermoplastic polyurethanes, acrylic polymers, vinyl polymers, polyolefins, derivatives and mixtures thereof.

The matrix materials can be part of a matrix system which further includes fillers, pigments, cure promoters and catalysts.

Suitable fillers can be organic but are preferably inorganic and can include mica or calcium carbonate, for example.

Pigments are preferably included in the matrix system for providing color to the resulting composites. Preferred pigments are inorganic materials such as cadmium-based pigments or oxide-based pigments. Non-limiting examples of oxide-based pigments include titanium dioxide, lead oxide-based pigments, and iron oxide-based pigments such as Fireblock Almond (FA), General Purpose Flexible Almond (GP/FLA), General Purpose Flexible Beige (GP/FLB) and Fireblock Beige (FB) which are polyester-based iron oxide pigments commercially available as the Colormatch Series from Plasticolor of Ashtabula, Ohio.

The present invention will now be illustrated by the following specific, non-limiting example.

EXAMPLE I

The effect of the polysiloxane Masil® SF-19 versus a conventional organic quaternary ammonium antistatic agent on the color of various polyester-based oxide pigments was evaluated by preparing dried films of mixtures of the various pigments with Masil SF-19 or the antistatic agent.

The organic quaternary ammonium antistatic agent used was an alkyl dipolyoxyethylene ethyl ammonium ethyl sulfate commercially available as LAROSTAT™ 1084 from Jordan Chemical Company of Folcroft, Pa.

The pigments used were FA (flame retardant), GP/FLA (general purpose), GP/FLB (general purpose) and FB (flame retardant) polyester-based iron oxide pigments similar to those commercially available from Plasticolor discussed above.

About 10 grams of each pigment were individually manually mixed with about 1 gram of Masil® SF-19 or LAROSTAT™ 1084 at a temperature of about 25° C. Smooth films of about 0.5 mm thickness of each mixture were placed on conventional glass analytical slides and cured on a conventional hot plate at about 500° F. (260° C.) for about 5 to about 15 minutes until a dried film was formed on each slide.

The whiteness and yellowness of four slides of each sample were evaluated using a Hunter Colorimeter Model D-25, which is commercially available from Hunter. The control samples contained only pigment. The averages of results of the Hunter tests of each sample are presented in Table 1 below.

TABLE 1

| | PIGMENT | | | |
|---|---|---|---|---|
| | FA | GP/FLA | GP/FLB | FB |
| CONTROL | | | | |
| white | 34.1 | 29.0 | 33.1 | 32.9 |
| yellow | 17.6 | 15.3 | 13.5 | 14.3 |
| SF-19 | | | | |
| white | 21.5 | 26.3 | 25.7 | 29.0 |
| yellow | 20.1 | 15.6 | 16.5 | 19.7 |
| LAROSTAT® 1084 | | | | |
| white | 0.6 | 15.5 | 20.3 | 7.6 |
| yellow | 31.5 | 24.1 | 23.5 | 26.5 |

As shown in Table 1, when added to the polyester-based iron oxide pigments, Masil® SF-19 polysiloxane had improved whiteness and yellowness over LAROSTAT® 1084. For example, in the sample using the FA (flame retardant) polyester-based iron oxide pigment, the sample including SF-19 according to the present invention was significantly whiter (varying only about 13 points from the control) than the sample using LAROSTAT® 1084 (which varied by about 33 points from the control). Also, the sample including SF-19 was less yellow (varying only about 3 points from the control) than the sample using LAROSTAT® 1084 (which varied by about 14 points from the control). Similar trends were observed for each sample tested.

EXAMPLE II

Sized glass fibers coated with an aqueous coating composition of the present invention were evaluated as a reinforcement for recreational vehicle (RV) panels.

E-glass fibers were sized with a sizing composition according to U.S. Pat. No. 4,752,527 (also including about 0.46 weight percent on a total solids basis butylated hydroxytoluene (BHT) and about 0.46 weight percent of the total weight of the composition of methyl ether of ethylene glycol (PGMME)). The BHT was obtained from and is commercially available from Neville Island Chemical Company of Neville island, Pittsburgh, Pa. The PGMME was obtained from and is commercially available from Dow Chemical Company of Midland, Mich. The sized glass fibers were dried in a conventional oven to about 0.7 weight percent solids on the glass and gathered into a roving.

The roving was treated with Masil® SF-19A by metering to deposit about 0.05 to about 0.10 weight percent solids onto the roving.

About 15 to about 30 grams of the coated roving of the present invention was added to each 70 grams of the thermosetting system. The thermosetting system included about 100 parts of CoResyn® 15-BE-200 orthophthalic polyester resin, which is commercially available from Interplastic Corporation of Minneapolis, Minn., 7 parts styrene, 0.12 parts pigment of the various polyester-based iron oxide pigments discussed above (FA, GP/FLA, GP/FLB and FB), 19 parts of calcium carbonate and 1 part cumene hydroperoxide. The reinforced matrix material was formed on a conventional panel line to produce a composite reinforced panel without discernible white or yellow streaks or discoloration.

The secondary coating composition of the present invention, when applied to sized glass fibers, is believed to provide enhanced wetting, lubricating, dispersing and antistatic properties during chopping and dispersion of the treated glass fibers in a matrix material. The coated glass fibers of the present invention lessen or eliminate discoloration of composites produced from matrix materials including pigments such as oxide-based pigments.

It will be appreciated by those skilled in the art that changes could be made to the embodiment(s) described above without departing from the broad inventive concept thereof. It is understood, therefore, that this invention is not limited to the particular embodiment disclosed, but it is intended to cover modifications which are within the spirit and scope of the invention, as defined by the appended claims.

Therefore, we claim:

1. An aqueous secondary coating composition adapted to coat a plurality of glass fibers having thereon the dried residue of a sizing composition, the aqueous secondary coating composition comprising:
   (a) a polysiloxane having:
      (1) an alkyl substituent attached through a carbon atom directly to a silicon atom of the polysiloxane;
      (2) an alkoxy substituent attached through a carbon atom of an alkyl group directly to a silicon atom of the polysiloxane, the alkoxy substituent comprising the alkyl group, an alkyl ether group and a terminal group selected from the group consisting of hydrogen and an alkoxy group having about 1 to about 8 carbon atoms, the alkyl ether group having the formula $(C_nH_{2n}O)_q$ where n has an average value of about 2 to about 6 and q has an average value of about 1 to about 10 inclusive; and
      (3) endblocking groups independently selected from the group consisting of a phenyl group, an alkyl group having about 1 to about 20 carbon atoms and combinations thereof,
   wherein the polysiloxane is essentially free of silicon-bonded hydroxy groups and alkoxy groups attached through an oxygen atom directly to a silicon atom of the polysiloxane, and
   (b) zero to less than about 50 weight percent on a total solids basis of a film-forming material capable of forming a uniform continuous coating on the glass fibers.

2. The aqueous coating composition according to claim 1, wherein the aqueous coating composition comprises a plurality of different polysiloxanes.

3. The aqueous coating composition according to claim 1, wherein the polysiloxane comprises about 1 to about 99 weight percent of the aqueous coating composition on a total weight percent basis.

4. The aqueous coating composition according to claim 1, wherein the alkyl group of the alkoxy substituent has about 3 to about 12 carbon atoms.

5. The aqueous coating composition according to claim 4, wherein the alkyl group of the alkoxy substituent is selected from the group consisting of n-propyl, n-butyl, n-pentyl, n-hexyl, n-heptyl, n-octyl, n-nonyl, n-decyl, n-undecyl and n-dodecyl.

6. The aqueous coating composition according to claim 1, wherein the polysiloxane comprises units of the following unit formulae:

(A) $(CH_3)_3SiO$;

(B) $(CH_3)_2SiO$; and (C) 
$$\left[ \begin{array}{c} CH_3 \\ | \\ -Si-O- \\ | \\ (CH_2)_p \\ | \\ X \\ | \\ R \end{array} \right]$$

in which
p has an average value of about 3 to about 12 inclusive; R is selected from the group consisting of hydrogen and an alkoxy group having about 1 to about 8 carbons; and X is an alkyl ether group of the formula $(C_nH_{2n}O)_q$, where n has an average value of about 2 to about 6 and q has an average value of about 1 to about 100 inclusive; and in which
   (A) is present in an amount of from about 10 to about 40 mole percent based upon the total mole percentage of (A)+(B)+(C);
   (B) is present in an amount of from zero to about 80 mole percent based upon the total mole percentage of (A)+(B)+(C); and
   (C) is present in an amount of from about 10 to about 90 mole percent based upon the total mole percentage of (A)+(B)+(C).

7. The aqueous coating composition according to claim 6, wherein the alkyl ether group X is selected from the group consisting of:
   (1) $(C_2H_4O)_a$;
   (2) $(C_3H_6O)_b$;
   (3) $(C_4H_8O)_c$; and
   (4) combinations thereof,
where a, b, and c each independently have average values of about 1 to about 100.

8. The aqueous coating composition according to claim 1, wherein the polysiloxane is represented by the following formula:

$$CH_3-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_k-\left[\underset{\underset{\underset{\underset{R}{|}}{X}}{\underset{|}{(CH_2)_p}}}{\overset{\overset{CH_3}{|}}{Si}}-O\right]_m-\underset{\underset{CH_3}{|}}{\overset{\overset{CH_3}{|}}{Si}}-CH_3$$

where k has an average value of about 0 to about 50 inclusive; m has an average value of about 1 to about 24 inclusive; p has an average value of about 3 to about 12 inclusive; R is selected from the group consisting of hydrogen and an alkoxy group having about 1 to about 8 carbons, and X is selected from the group consisting of:
   (1) $(C_2H_4O)_a$;
   (2) $(C_3H_6O)_b$;
   (3) $(C_4H_8O)_c$; and
   (4) combinations thereof;
where a, b and c each independently have average values of about 1 to about 100.

9. The aqueous coating composition according to claim 1, wherein the number average molecular weight of the polysiloxane is about 400 to about 10,000.

10. The aqueous coating composition according to claim 1, wherein the film-forming material is selected from the group consisting of starches, cellulosic materials, thermoplastic materials, thermosetting materials and mixtures thereof.

11. The aqueous coating composition according to claim 10, wherein the film-forming material is selected from the group consisting of thermoplastic and thermosetting materials selected from the group consisting of acrylic polymers, aminoplasts, alkyds, polyepoxides, phenolics, polyamides, polyolefins, polyesters, olefins, polyurethanes, vinyl polymers, derivatives and mixtures thereof.

12. The aqueous coating composition according to claim 1, wherein the coating composition comprises about 60 to about 95 weight percent water on a total weight basis.

13. The aqueous coating composition according to claim 1, further comprising a water-soluble, polar solvent for the polysiloxane.

14. The aqueous coating composition according to claim 13, wherein the solvent is selected from the group consisting of alcohols, ketones, glycol ethers and mixtures thereof.

15. The aqueous coating composition according to claim 14, wherein the alcohol is selected from the group consisting of monohydric and polyhydric alcohols.

16. The aqueous coating composition according to claim 14, wherein the alcohol is selected from the group consisting of primary, secondary, and tertiary alcohols.

17. The aqueous coating composition according to claim 15, wherein the alcohol is (1) a monohydric alcohol selected from the group consisting of methanol, ethanol, 1-propanol, 2-propanol, 1-butanol, 2-methyl-1-propanol, 2-butanol, 2-methyl-2-propanol, 1-pentanol, 1-hexanol, 1-heptanol, 2-propanol, cyclohexanol; (2) a polyhydric alcohol selected from the group consisting of 1,2-ethanediol, 1,2-propanediol and 1,2,3-propanetriol and (3) mixtures thereof.

18. The aqueous coating composition according to claim 14, wherein the ketone is selected from the group consisting of acetone, methyl ethyl ketone, methyl isopropyl ketone, methyl isobutyl ketone, methyl ethyl butyl ketone, acetoin, diacetone alcohol and mixtures thereof.

19. The aqueous coating composition according to claim 13, wherein the solvent is less than about 40 weight percent of the aqueous coating composition on a total weight basis.

20. The aqueous coating composition according to claim 1, further comprising an additive selected from the group consisting of antioxidants, ultraviolet light stabilizers, cure promoters, surfactants, functional organo silane coupling agents and mixtures thereof.

21. A glass fiber strand having thereon the dried residue of an aqueous secondary coating composition, the glass fiber strand comprising a plurality of glass fibers having thereon a primary coating of a dried residue of an aqueous sizing composition, the aqueous secondary coating composition comprising:

(a) a polysiloxane having:
(1) an alkyl substituent attached through a carbon atom directly to a silicon atom of the polysiloxane;
(2) an alkoxy substituent attached through a carbon atom of an alkyl group directly to a silicon atom of the polysiloxane, the alkoxy substituent comprising the alkyl group, an alkyl ether group and a terminal group selected from the group consisting of hydrogen and an alkoxy group having about 1 to about 8 carbon atoms, the alkyl ether group having the formula $(C_nH_{2n}O)_q$ where n has an average value of about 2 to about 6 and q has an average value of about 1 about 100 inclusive; and
(3) endblocking groups independently selected from the group consisting of a phenyl group, an alkyl group having about 1 to about 20 carbon atoms and combinations thereof, wherein the polysiloxane is essentially free of silicon-bonded hydroxy groups and alkoxy groups attached through an oxygen atom directly to a silicon atom of the polysiloxane, and (b) zero to less than about 50 weight percent on a total solids basis of a film-forming material capable of forming a uniform continuous coating on the glass fibers.

22. A glass fiber-reinforced composite comprising the glass fiber strand of claim 21 and a matrix material.

23. The glass fiber-reinforced composite of claim 22, wherein the matrix material is a thermosetting matrix material selected from the group consisting of polyesters, vinyl esters, epoxides, phenolics, aminoplasts, thermosetting polyurethanes and combinations thereof.

24. The glass fiber strand according to claim 21, wherein the aqueous secondary coating composition comprises a plurality of different polysiloxanes.

25. The glass fiber strand according to claim 21, wherein the polysiloxane comprises about 1 to about 99 weight percent of the aqueous secondary coating composition on a total weight percent basis.

26. The glass fiber strand according to claim 21, wherein the alkyl group of the alkoxy substituent of the aqueous secondary coating composition has about 3 to about 12 carbon atoms.

27. The glass fiber strand according to claim 26, wherein the alkyl group of the alkoxy substituent of the aqueous secondary coating composition is selected from the group consisting of n-propyl, n-butyl, n-pentyl, n-hexyl, n-heptyl, n-octyl, n-nonyl, n-decyl, n-undecyl and n-dodecyl.

28. The glass fiber strand according to claim 21, wherein the polysiloxane of the aqueous secondary coating composition comprises units of the following unit formulae:

(A) $(CH_3)_3SiO$;

(B) $(CH_3)_2SiO$; and (C) 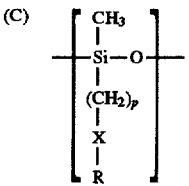

in which p has an average value of about 3 to about 12 inclusive;
R is selected from the group consisting of hydrogen and an alkoxy group having about 1 to about 8 carbons; and X is an alkyl ether group of the formula $(C_nH_{2n}O)_q$, where n has an average value of about 2 to about 6 and q has an average value of about 1 to about 100 inclusive; and in which (A) is present in an amount of from about 10 to about 40 mole percent based upon the total mole percentage of (A)+(B)+(C);

(B) is present in an amount of from zero to about 80 mole percent based upon the total mole percentage of (A)+(B)+(C); and (C) is present in an amount of from about 10 to about 90 mole percent based upon the total mole percentage of (A)+(B)+(C).

29. The glass fiber strand according to claim 28, wherein the alkyl ether group X of the aqueous secondary coating composition is selected from the group consisting of:

(1) $(C_2H_4O)_a$;
(2) $(C_3H_6O)_b$;
(3) $(C_4H_8O)_c$; and
(4) combinations thereof, where a, b, and c each independently have average values of about 1 to about 100.

30. The glass fiber strand according to claim 21, wherein the polysiloxane of the aqueous secondary coating composition is represented by the following formula:

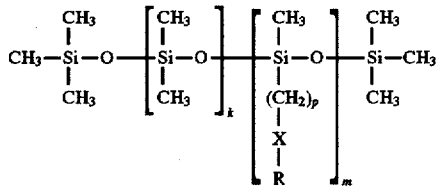

where k has an average value of about 0 to about 50 inclusive; m has an average value of about 1 to about 24 inclusive; p has an average value of about 3 to about 12 inclusive; R is selected from the group consisting of hydrogen and an alkoxy group having about 1 to about 8 carbons, and X is selected from the group consisting of:

(1) $(C_2H_4O)_a$;
(2) $(C_3H_6O)_b$;
(3) $(C_4H_8O)_c$; and
(4) combinations thereof;

where a, b and c each independently have average values of about 1 to about 100.

31. The glass fiber strand according to claim 21, wherein the number average molecular weight of the polysiloxane of the aqueous secondary coating composition is about 400 to about 10,000.

32. The glass fiber strand according to claim 21, wherein the film-forming material of the aqueous secondary coating composition is selected from the group consisting of starches, cellulosic materials, thermoplastic materials, thermosetting materials and mixtures thereof.

33. The glass fiber strand according to claim 32, wherein the film-forming material is selected from the group consisting of thermoplastic and thermosetting materials selected from the group consisting of acrylic polymers, aminoplasts, alkyds, polyepoxides, phenolics, polyamides, polyolefins, polyesters, olefins, polyurethanes, vinyl polymers, derivatives and mixtures thereof.

34. The glass fiber strand according to claim 21, wherein the aqueous secondary coating composition comprises about 60 to about 95 weight percent water on a total weight basis.

35. The glass fiber strand according to claim 21, further comprising a water-soluble, polar solvent for the polysiloxane of the aqueous secondary coating composition.

36. The glass fiber strand according to claim 35, wherein the solvent is selected from the group consisting of alcohols, ketones, glycol ethers and mixtures thereof.

37. The glass fiber strand according to claim 35, wherein the solvent is less than about 40 weight percent of the aqueous coating composition on a total weight basis.

38. The glass fiber strand according to claim 21, wherein the aqueous secondary coating composition further comprises an additive selected from the group consisting of antioxidants, ultraviolet light stabilizers, cure promoters, surfactants, functional organo silane coupling agents and mixtures thereof.

* * * * *

UNITED STATES PATENT AND TRADEMARK OFFICE
CERTIFICATE OF CORRECTION

| | | |
|---|---|---|
| PATENT NO. | : 5,672,641 | Page 1 of 1 |
| APPLICATION NO. | : 08/376998 | |
| DATED | : September 30, 1997 | |
| INVENTOR(S) | : Kenneth D. Beer, Barbara Anderson and Richard Alan Davis | |

It is certified that error appears in the above-identified patent and that said Letters Patent is hereby corrected as shown below:

Claim 1, column 11, line 35, last line should read . . . --about 1 to about 100 inclusive; and--

Signed and Sealed this

Twenty-sixth Day of February, 2008

JON W. DUDAS
*Director of the United States Patent and Trademark Office*